(12) United States Patent
Kitagawa et al.

(10) Patent No.: US 11,480,359 B2
(45) Date of Patent: Oct. 25, 2022

(54) AIR-CONDITIONING CONTROL DEVICE

(71) Applicant: DAIKIN INDUSTRIES, LTD., Osaka (JP)

(72) Inventors: Keita Kitagawa, Osaka (JP); Takuya Kazusa, Osaka (JP); Youichi Handa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 301 days.

(21) Appl. No.: 16/754,264

(22) PCT Filed: Aug. 23, 2018

(86) PCT No.: PCT/JP2018/031091
§ 371 (c)(1),
(2) Date: Apr. 7, 2020

(87) PCT Pub. No.: WO2019/087537
PCT Pub. Date: May 9, 2019

(65) Prior Publication Data
US 2020/0333033 A1 Oct. 22, 2020

(30) Foreign Application Priority Data
Oct. 30, 2017 (JP) .............................. JP2017-209734

(51) Int. Cl.
*F24F 11/64* (2018.01)
*F24F 11/80* (2018.01)
(Continued)

(52) U.S. Cl.
CPC .............. *F24F 11/64* (2018.01); *F24F 11/65* (2018.01); *F24F 11/80* (2018.01);
(Continued)

(58) Field of Classification Search
CPC .. F24F 11/64; F24F 11/65; F24F 11/80; F24F 2110/10; F24F 2120/12; F24F 2120/14;
(Continued)

(56) References Cited

U.S. PATENT DOCUMENTS 9,464,819 B2 10/2016 Enohara et al.
2016/0061478 A1* 3/2016 Honda .................... F24F 11/62
165/237

(Continued)

FOREIGN PATENT DOCUMENTS

CN 105339742 A * 2/2016 .............. F24F 11/76
JP 4-131639 A 5/1992
(Continued)

OTHER PUBLICATIONS

International Search Report (PCT/ISA/210) issued in PCT/P2018/031091, dated Nov. 20, 2018.

*Primary Examiner* — Jigneshkumar C Patel
(74) *Attorney, Agent, or Firm* — Birch, Stewart, Kolasch & Birch, LLP

(57) ABSTRACT

An estimation unit estimates a thermal sensation representing how hot or cold a user feels based on an image of the user taken by a camera. A control unit controls an air-conditioning operation of an air conditioner based on an estimation result of the estimation unit so that the thermal sensation falls within a target range, the air conditioner targeting a room in which the user is present. The image shows a motion and/or state of the user representing a hot or cold sensation of the user, and the estimation unit extracts the motion and/or state of the user from the image to estimate the thermal sensation.

13 Claims, 9 Drawing Sheets

(51) Int. Cl.
  *F24F 11/65* (2018.01)
  *G05B 13/02* (2006.01)
  *G05B 13/04* (2006.01)
  *F24F 120/14* (2018.01)
  *F24F 110/10* (2018.01)

(52) U.S. Cl.
  CPC ....... *G05B 13/0265* (2013.01); *G05B 13/042* (2013.01); *F24F 2110/10* (2018.01); *F24F 2120/14* (2018.01)

(58) Field of Classification Search
  CPC ........ F24F 11/77; F24F 11/79; F24F 2120/20; F24F 2120/10; F24F 11/63; G05B 13/0265; G05B 13/042; G06F 3/011; G06F 2203/011; Y02B 30/70
  USPC ........................................................ 700/278
  See application file for complete search history.

(56) References Cited

U.S. PATENT DOCUMENTS

2016/0363340 A1* 12/2016 Shikii ...................... F24F 11/30
2018/0073930 A1* 3/2018 Meggers ................. G01J 5/047

FOREIGN PATENT DOCUMENTS

| JP | 6-180139 A | 6/1994 |
| JP | 6-265190 A | 9/1994 |
| JP | H06265190 A * | 9/1994 |
| JP | 5238679 B2 | 7/2013 |
| JP | 2915-17753 A | 1/2015 |
| JP | 2315-38402 A | 2/2015 |
| JP | 2015-111019 A | 6/2015 |
| JP | 2015-161425 A | 9/2015 |
| JP | 2018-35365 A | 3/2016 |

* cited by examiner

| USER IDENTIFICATION INFORMATION | USER'S ACTION/STATE | THERMAL SENSATION |
|---|---|---|
| U1 | FANNING, ROLLING SLEEVES UP, PERSPIRING | HOT |
| U2 | RUBBING BODY, MOVING LESS ACTIVELY | COLD |
| ... | ... | ... |
| | | ... |

ESTIMATION OF THERMAL SENSATION

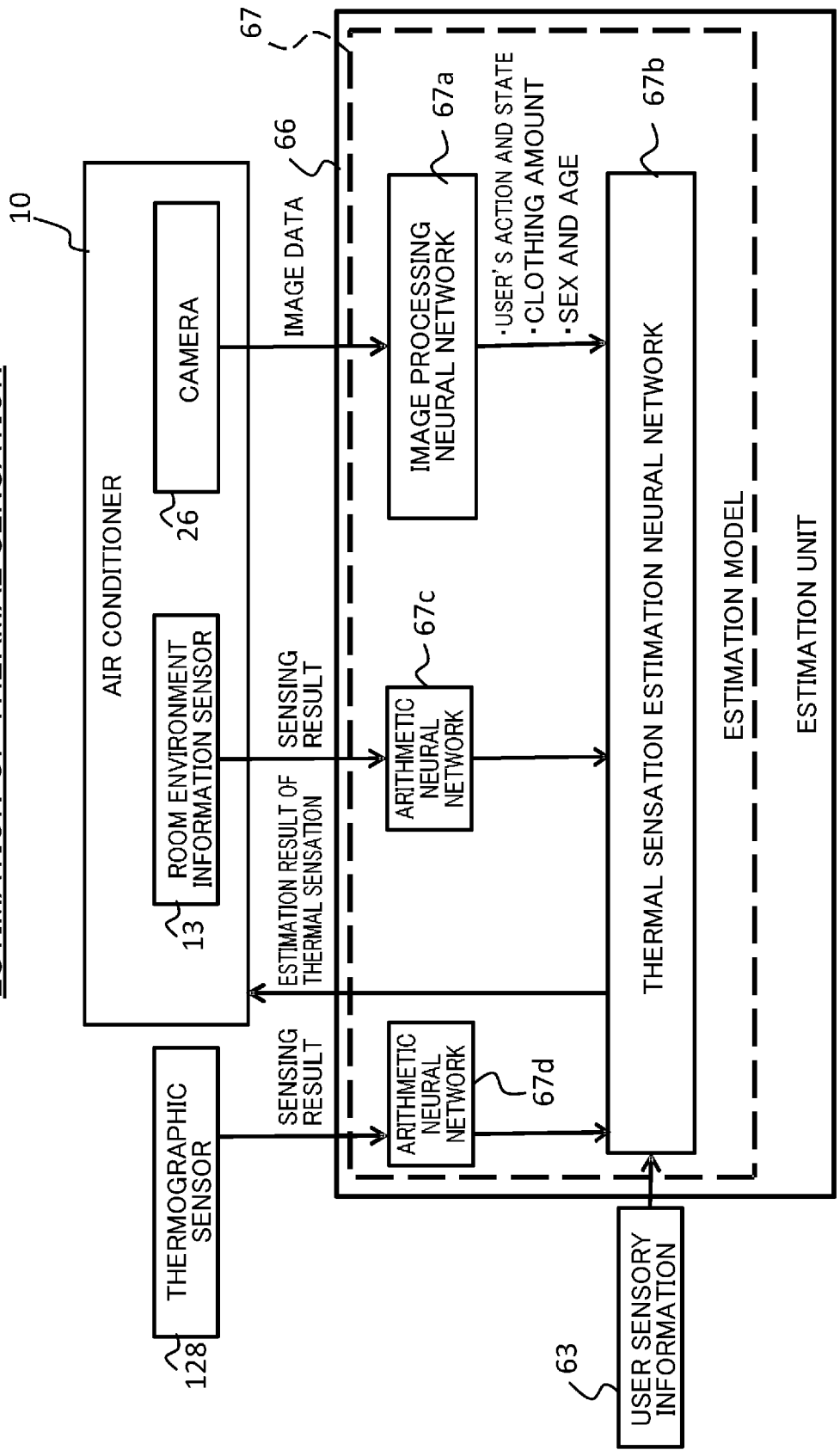

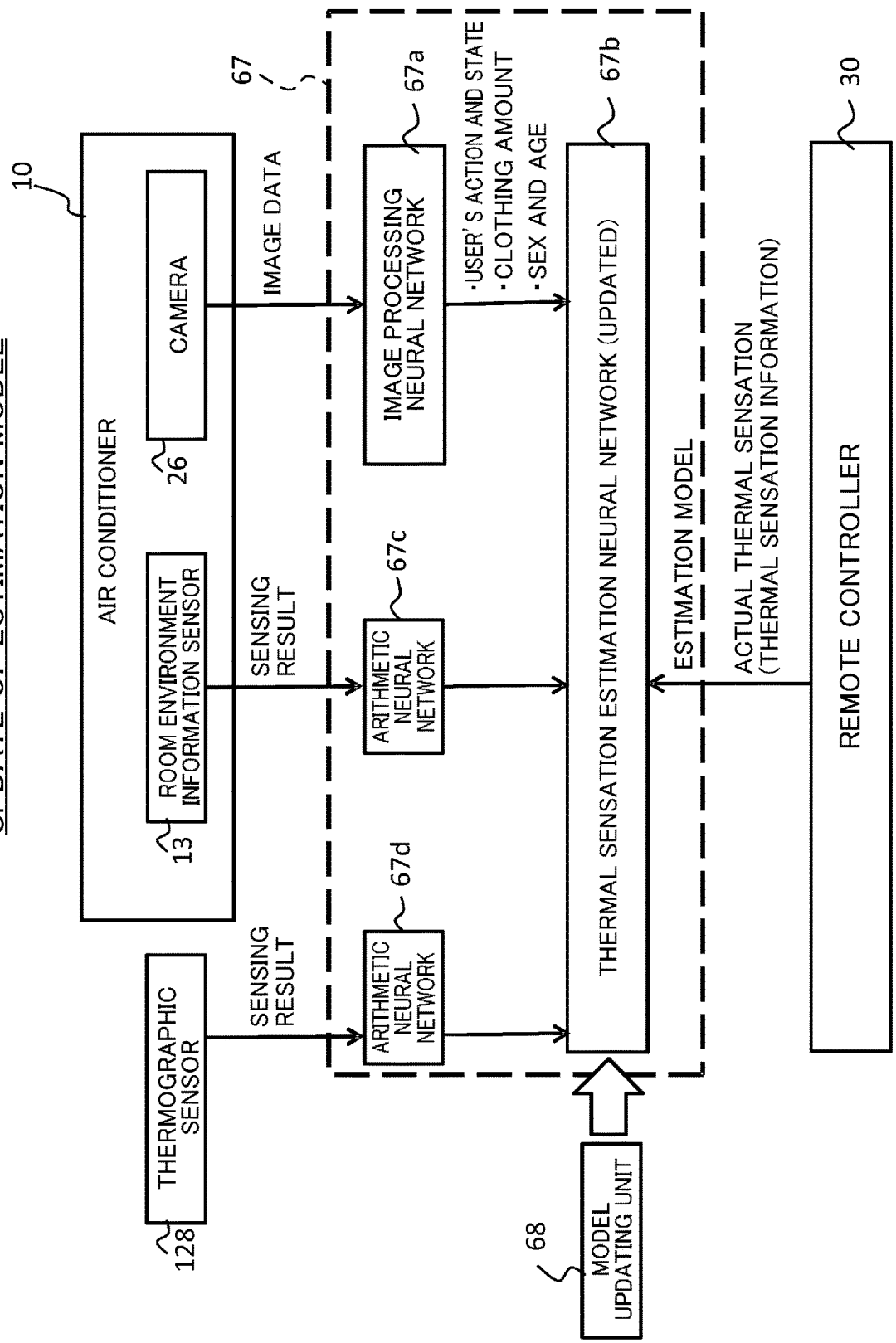

AIR-CONDITIONING CONTROL DEVICE

TECHNICAL FIELD

The present invention relates to an air-conditioning control apparatus.

BACKGROUND ART

As shown in Patent Document 1, there has been known a technique for extracting a motion of an operator (hereinafter referred to as a user) from a video image of a camera that takes an image of the user, and obtaining an evaluation value of the degree of concentration by using the extracted motion. According to Patent Document 1, a mode (e.g., a cooling mode) of a device that influences the environment (e.g., an air conditioner) is specified in accordance with the evaluation value of the degree of concentration.

CITATION LIST

Patent Document

Patent Document 1: Japanese Unexamined Patent Publication No. 2016-35365

SUMMARY OF THE INVENTION

Technical Problem

A user in a room which is targeted by an air conditioner raises or lowers a set temperature of the room by freely using a remote controller installed in the room based on his or her own sense. When changing the set temperature of the room, the user need to move to the position of the remote controller, which is not user friendly.

An object of the present invention is to make the environment in a room more comfortable for a user even if the user does not give an instruction to an air conditioner by using a remote controller or the like.

Solution to the Problem

A first aspect of the present disclosure is directed to an air-conditioning control apparatus, including: an imaging unit (26) that takes an image of at least one user (U1, U2, U3); an estimation unit (66) that estimates a thermal sensation representing how hot or cold the at least one user (U1, U2, U3) feels based on the image of the at least one user (U1, U2, U3) taken by the imaging unit (26); and a control unit (14) that controls a first air-conditioning operation of an air conditioner (10) based on an estimation result of the estimation unit (66) so that the thermal sensation falls within a target range, the air conditioner (10) targeting a room in which the at least one user (U1, U2, U3) is present. The image shows a motion and/or state of the at least one user (U1, U2, U3) representing a hot or cold sensation of the user (U1, U2, U3), and the estimation unit (66) extracts the motion and/or state of the at least one user (U1, U2, U3) from the image to estimate the thermal sensation.

In this aspect, if the thermal sensation of the user is estimated based on the image showing the motion and/or state of the one user representing the hot or cold sensation of the user, the first air-conditioning operation of the air conditioner is controlled based on the estimation result so that the thermal sensation of the user, which is the estimation result, falls within the target range. As a result, even if the user does not give an instruction to the air conditioner by using a remote controller or the like, the air conditioner performs an air-conditioning operation suitable for bringing the user's thermal sensation within the target range in accordance with the estimated thermal sensation of the user, thereby giving improved comfort to the user in the room.

A second aspect is an embodiment of the first aspect. In the second aspect, the air conditioner (10) includes a sensor (13) that senses room environment information about an environment in the room, and the estimation unit (66) estimates the thermal sensation also based on the room environment information.

This improves estimation accuracy of the user's thermal sensation.

A third aspect is an embodiment of the first or second aspect. In the third aspect, the estimation unit (66) calculates a clothing amount of the at least one user (U1, U2, U3) from the image, and estimates the thermal sensation also based on the calculated clothing amount.

This improves estimation accuracy of the user's thermal sensation.

A fourth aspect is an embodiment of any one of the first to third aspects. In the fourth aspect, the estimation unit (66) calculates sex and/or an age of the at least one user (U1, U2, U3) from the image, and estimates the thermal sensation also based on the calculated sex and/or age of the at least one user (U1, U2, U3).

This improves estimation accuracy of the user's thermal sensation.

A fifth aspect is an embodiment of any one of the first to fourth aspects. In the fifth aspect, the air-conditioning control apparatus further includes a surface temperature measuring unit (128) that measures a surface temperature of the at least one user present in the room. The estimation unit (66) estimates the thermal sensation also based on a measurement result of the surface temperature measuring unit (128).

This improves estimation accuracy of the user's thermal sensation.

A sixth aspect is an embodiment of any one of the first to fifth aspects. In the sixth aspect, the air conditioner (10) is installed in a ceiling of the room, and the imaging unit (26) is provided for the air conditioner (10).

This allows the imaging unit (26) to take an image of the user in the room with reduced possibility that the user is blocked by some obstacles.

A seventh aspect is an embodiment of any one of the first to sixth aspects. In the seventh aspect, if the at least one user (U1, U2, U3) includes users (U1, U2, U3) present in the room, the estimation unit (66) estimates the thermal sensation of each of the users (U1, U2, U3).

An eighth aspect is an embodiment of the seventh aspect. In the eighth aspect, the air-conditioning control apparatus further includes: a storage unit (62) that stores user sensory information (63) about the motion and/or state of each of the users (U1, U2, U3) associated with the thermal sensation of the user (U1, U2, U3) who is showing the motion and/or the state. The estimation unit (66) extracts the motion and/or state of each of the users (U1, U2, U3) from the image, and estimates the thermal sensation of the user (U1, U2, U3) using an extraction result and the user sensory information (63).

This improves estimation accuracy of the thermal sensation of each user.

A ninth aspect is an embodiment of any one of the first to eighth aspects. In the ninth aspect, the air-conditioning control apparatus further includes: a receiving unit (30)

capable of receiving thermal sensation information inputted by the at least one user (U1, U2, U3), the thermal sensation information representing the thermal sensation of the at least one user (U1, U2, U3); and a model updating unit (68) that learns for an estimation model (67) used for estimating the thermal sensation, based on the image taken by the imaging unit (26) and/or the thermal sensation information received via the receiving unit (30).

Thus, performing an operation of estimating the thermal sensation using the estimation model that has learned improves the estimation accuracy of the user's thermal sensation.

A tenth aspect is an embodiment of any one of the first to eighth aspects. In the tenth aspect, the air-conditioning control apparatus further includes: a model updating unit (68) that recognizes an actual thermal sensation of the at least one user (U1, U2, U3) from the image taken by the imaging unit (26) after the first air-conditioning operation performed based on the estimation result of the estimation unit (66), and learns for an estimation model (67) used for estimating the thermal sensation, based on a recognition result.

This further improves the accuracy of the estimation model so that the result of the estimation using the estimation model matches an actual concentration degree as much as possible. Performing the operation of estimating the user's thermal sensation using the estimation model that has learned further improves the estimation accuracy of the user's thermal sensation.

An eleventh aspect is an embodiment of the tenth aspect. In the eleventh aspect, the model updating unit (68) learns for the estimation model (67) based on a change in the motion and state based on which the thermal sensation of the at least one user (U1, U2, U3) has been determined through comparison between the image taken by the imaging unit (26) after the first air-conditioning operation performed based on the estimation result of the estimation unit (66) and the image taken by the imaging unit (26) before the first air-conditioning operation.

This further improves the accuracy of the estimation model so that the result of the estimation using the estimation model matches an actual concentration degree as much as possible. Performing the operation of estimating the user's thermal sensation using the estimation model that has learned further improves the estimation accuracy of the user's thermal sensation.

A twelfth aspect is an embodiment of the eleventh aspect. In the twelfth aspect, the change in the motion and state based on which the thermal sensation of the at least one user (U1, U2, U3) has been determined is a decrease in frequency of the motion and state, or an absence of the motion and state.

As a result, whether or not the result of the estimation using the estimation model matches an actual concentration degree is determined more accurately.

A thirteenth aspect is an embodiment of any one of the tenth to twelfth aspects. In the thirteenth aspect, the air-conditioning control apparatus further includes a receiving unit (30) capable of receiving thermal sensation information inputted by the user (U1, U2, U3), the thermal sensation information representing the thermal sensation of the at least one user (U1, U2, U3). The control unit (14) learns an item of control of the first air-conditioning operation based on the thermal sensation information received via the receiving unit (30) after the first air-conditioning operation performed based on the estimation result of the estimation unit (66) so that the thermal sensation of the at least one user (U1, U2, U3) falls within the target range.

Thus, the first air-conditioning operation to be performed next easily makes the thermal sensation of the user (U1, U2, U3) more comfortable.

A fourteenth aspect is an embodiment of any one of the tenth to thirteenth aspects. In the fourteenth aspect, the control unit (14) learns an item of control of the first air-conditioning operation based on the image taken by the imaging unit (26) after the first air-conditioning operation performed based on the estimation result of the estimation unit (66) so that the thermal sensation of the at least one user (U1, U2, U3) falls within the target range.

Thus, the first air-conditioning operation to be performed next easily makes the thermal sensation of the user (U1, U2, U3) more comfortable.

A fifteenth aspect is an embodiment of the thirteenth or fourteenth aspect. In the fifteenth aspect, the item of the control of the first air-conditioning operation includes at least one of a rotational speed of an indoor fan (12) included in the air conditioner (10), a position of a flap (16) adjusting a direction of air blown out from the air conditioner (10), or a set temperature of the air conditioner (10).

Thus, the first air-conditioning operation to be performed next easily makes the thermal sensation of the user (U1, U2, U3) more comfortable.

Advantages of the Invention

According to the aspects of the present disclosure, improved comfort is given to a user in a room.

BRIEF DESCRIPTION OF THE DRAWINGS

FIG. 8 is a conceptual diagram illustrating input and output of an estimation model in estimation of a thermal sensation according to a second embodiment of the present invention.

FIG. 9 is a conceptual diagram illustrating input and output of an estimation model in updating of the estimation model according to the second embodiment.

DESCRIPTION OF EMBODIMENTS

Embodiments of the present disclosure will be described in detail with reference to the drawings. The following embodiments are merely exemplary ones in nature, and are not intended to limit the scope, applications, or use of the present invention.

First Embodiment

Outline

Figure 1:
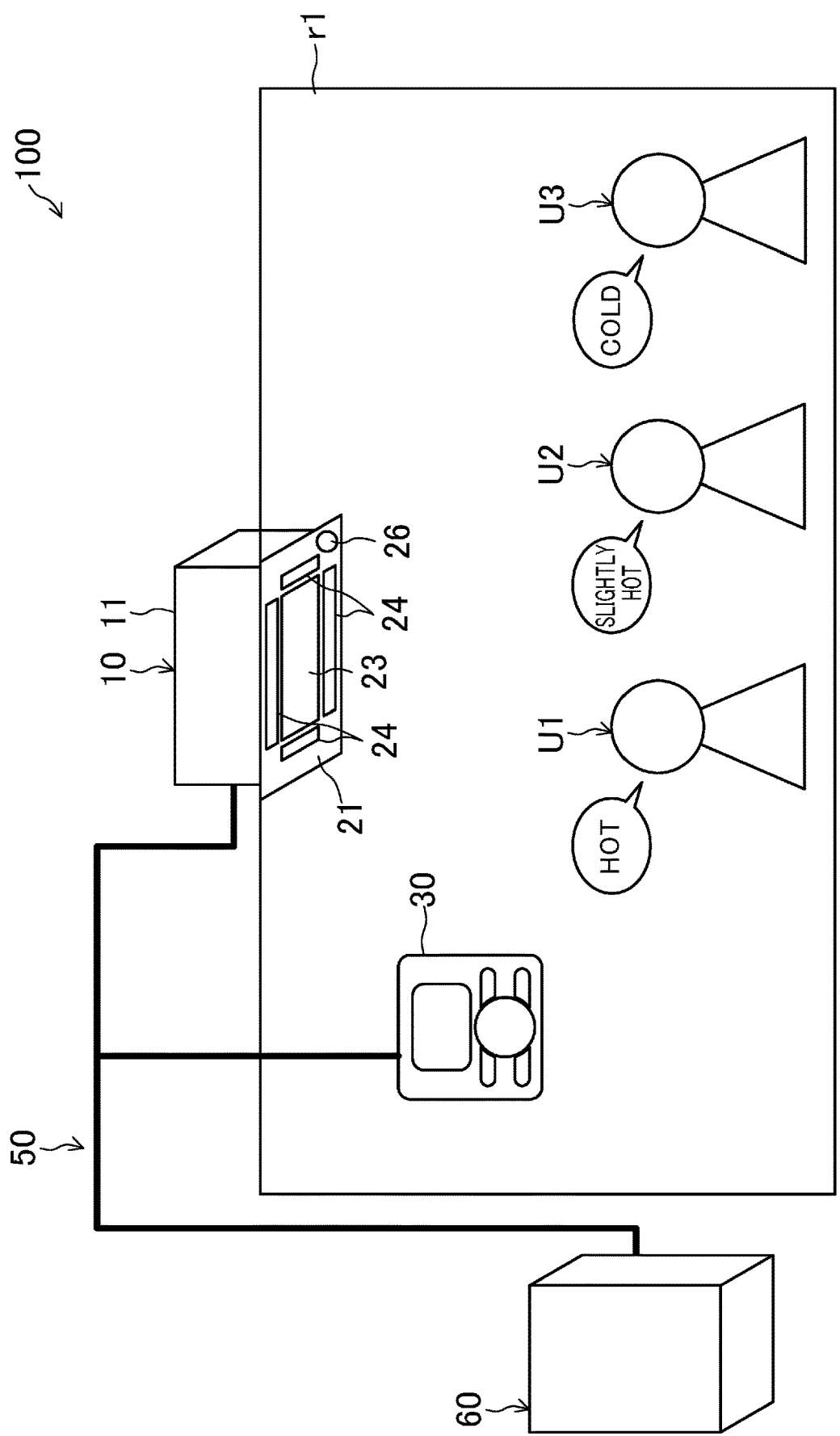
FIG. 1 is an external view illustrating an air-conditioning system including an air-conditioning control apparatus.
Figure 2:
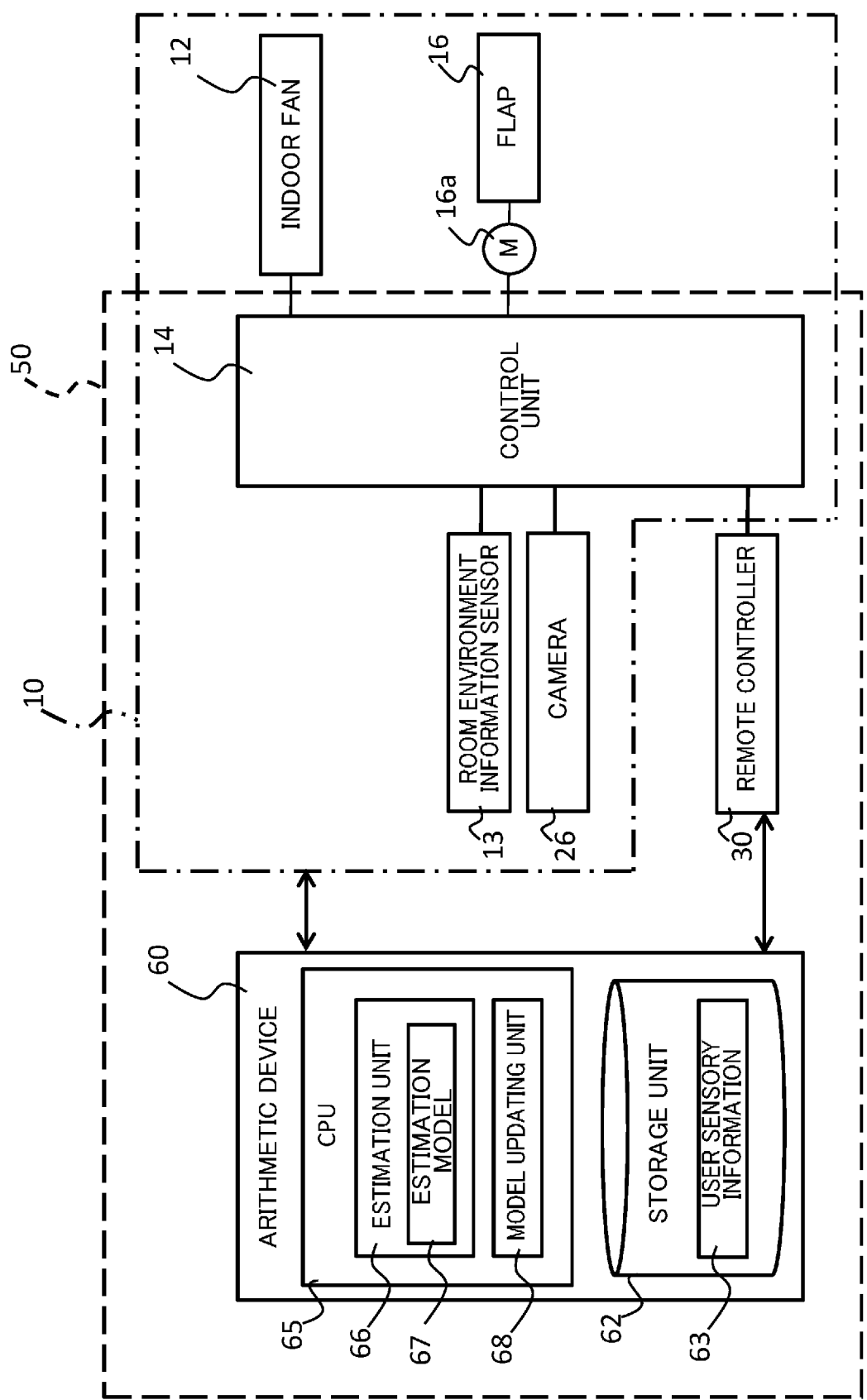
FIG. 2 is a block diagram schematically illustrating a configuration of the air-conditioning system including the air-conditioning control apparatus.

FIG. 1 is an external view illustrating an air-conditioning system (100) including an air-conditioning control apparatus (50) of the present embodiment. As shown in FIGS. 1 and 2, the air-conditioning control apparatus (50) includes some of components of an air conditioner (10), a remote controller (30) (corresponding to a receiving unit), and an arithmetic device (60).

As shown in FIG. 1, the air conditioner (10) is provided in a room (r1) which is a target to be air-conditioned, and conditions the air in the room (r1). The remote controller (30) is used by a user (U1, U2, U3) to directly give an instruction to the air conditioner (10) to set a target temperature and humidity of the air conditioner (10), select an operating mode of the air conditioner (10), and turn the air conditioner (10) on or off through operation of the remote controller (30).

The air-conditioning control apparatus (50) controls an air-conditioning operation of the air conditioner (10). In particular, the air-conditioning control apparatus (50) of the present embodiment estimates a thermal sensation representing how hot or cold the user (U1, U2, U3) feels by using an image showing the user (U1, U2, U3) present in the room (r1), and controls the air-conditioning operation (corresponding to a first air-conditioning operation) of the air conditioner (10) based on the estimated thermal sensation, thereby providing an environment in accordance with the thermal sensation of the user (U1, U2, U3).

Configuration of Air Conditioner

The air conditioner (10) is an air conditioner installed in a ceiling, and has a body (11) embedded in a ceiling of the room (r1). A bottom surface (21) of the body (11) is exposed in the room (r1), and has an air inlet (23) through which the air is sucked into the body (11), and an air outlet (24) through which the air is blown out of the body (11) into the room (r1).

A camera (26) (corresponding to an imaging unit) is provided on the bottom surface (21) of the body (11).

The camera (26) has a lens (not shown) facing downward of the air conditioner (10) to take an image of the user (U1, U2, U3) present in the room (r1). The image may be a moving image of the user (U1, U2, U3), or still images of the user (U1, U2, U3) successively taken, but in this example, the image is a moving image. The image taken by the camera (26) shows a motion and state (including facial expressions) of the user (U1, U2, U3) representing a hot or cold sensation of the user (U1, U2, U3). The user (U1, U2, U3), when feels hot, naturally fans himself or herself, rolls up the sleeves of the clothes he or she wears, or perspires, in order to let the heat out. Conversely, when feels cold, the user (U1, U2, U3) rubs his or her body, or moves less. The camera (26) takes an image of such motions and states of the user (U1, U2, U3) as an image representing the hot or cold sensation of the user (U1, U2, U3).

The body (11) of the air conditioner (10) includes a heat exchanger (not shown) that exchanges heat between a refrigerant and the air sucked into the body (11) through the air inlet (23), an indoor fan (12) that supplies the air that has exchanged heat with the refrigerant into the room (r1) through the air outlet (24), a flap (16) provided for the air outlet (24) to adjust the direction of the air, and a motor (16a) connected to a rotary shaft of the flap (16) to serve as a drive source for changing the orientation of the flap (16) (see FIG. 2).

The body (11) further includes therein a room environment information sensor (13) (corresponding to a sensor), and a control unit (14).

The room environment information sensor (13) senses room environment information about the environment in the room (r1), and is a suction sensor provided near the air inlet (23). The room environment information includes, for example, a temperature and humidity of the air in the room (r1) sucked through the air inlet (23).

The control unit (14) is a microcomputer including a CPU and a memory. The control unit (14) is electrically connected to the indoor fan (12), the motor (16a) of the flap (16), the room environment information sensor (13), and the camera (26). The control unit (14) is also connected to the remote controller (30) and the arithmetic device (60) to be able to communicate with them.

The control unit (14) controls the air-conditioning operation of the air conditioner (10) by controlling the drive of the indoor fan (12), the motor (16a) of the flap (16), and any other suitable components based on the sensing result of the room environment information sensor (13).

In particular, the control unit (14) of the present embodiment controls the air-conditioning operation (the first air-conditioning operation) of the air conditioner (10) in the room (r1) based on the estimation result, which is the thermal sensation of the user (U1, U2, U3) estimated by the arithmetic device (60), so that the thermal sensation of the user (U1, U2, U3) falls within a target range. Details of the air-conditioning operation based on the estimation result of the thermal sensation will be described later.

Remote Controller

The remote controller (30) is attached to a wall surface of the room (r1). Although not shown, the remote controller (30) includes a display showing various screens, and operation buttons used by the user (U1, U2, U3) to operate. If the user (U1, U2, U3) uses the operation buttons to operate, the various screens associated with the operation of the user (U1, U2, U3) are shown on the display. The display shows the set temperature, the set humidity, and other elements of air in the room (r1) as a normal screen.

The remote controller (30) of the present embodiment is capable of receiving thermal sensation information inputted by the user (U1, U2, U3), the thermal sensation information representing an actual thermal sensation of the user (U1, U2, U3). Based on the inputted thermal sensation information, the arithmetic device (60) can determine whether or not the estimated thermal sensation of the user (U1, U2, U3) matches the actual thermal sensation of the user (U1, U2, U3). In view of the fact that the air conditioner (10) performs the air-conditioning operation based on the estimated thermal sensation of the user (U1, U2, U3), the information is preferably inputted while the air conditioner (10) is performing the air-conditioning operation based on the estimated thermal sensation of the user (U1, U2, U3), but this is not limiting. The inputted information may be used for correction of the item of control of the air-conditioning operation performed by the air conditioner (10) in accordance with the estimated thermal sensation of the user (U1, U2, U3) (e.g., for adjustment of a rotational speed of the indoor fan (12) in accordance with the actual thermal sensation).

Configuration of Air-Conditioning Control Apparatus

As shown in FIG. 2, the air-conditioning control apparatus (50) includes the remote controller (30) corresponding to the receiving unit and the arithmetic device (60) in addition to the room environment information sensor (13), the control unit (14), and the camera (26), which are some of the components of the air conditioner (10).

Since the room environment information sensor (13), the control unit (14), the camera (26), and the remote controller (30) have already been described above, the following description focuses on the arithmetic device (60).

Arithmetic Device

The arithmetic device (60) is a computer including a storage unit (62) and a CPU (65), and mainly performs estimation of the thermal sensation of the user (U1, U2, U3). The arithmetic device (60) may be a cloud server, or a local server.

The arithmetic device (60) is connected to the air conditioner (10) and the remote controller (30) to be able to communicate with each other via wires or wirelessly. Thus, the arithmetic device (60) can acquire the sensing result of the room environment information sensor (13), which is the temperature or the like of the room (r1), and the image taken by the camera (26) from the air conditioner (10), and can acquire the thermal sensation information representing the actual thermal sensation, if inputted by the user (U1, U2, U3) via the remote controller (30). The arithmetic device (60) can output the thermal sensation estimated by itself to the control unit (14) of the air conditioner (10).

In this embodiment, the arithmetic device (60) is configured as a device different from the air conditioner (10). However, similarly to the control unit (14), the arithmetic device (60) may be a microcomputer including a CPU and a memory, and may be incorporated in the air conditioner (10).

The storage unit (62) is a nonvolatile storage device such as a flash memory and a hard disk. The storage unit (62) mainly stores user sensory information (63).

Figure 3:
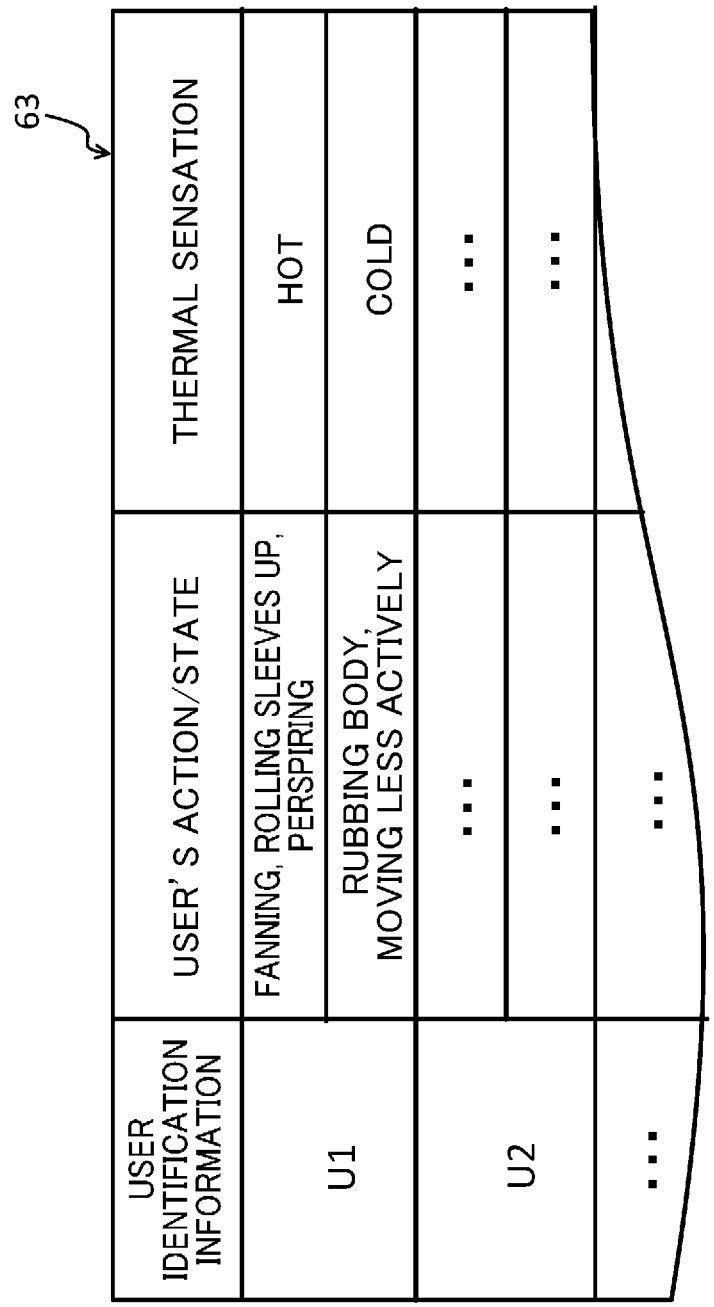
FIG. 3 is a conceptual diagram of user sensory information.

As shown in FIG. 3, the user sensory information (63) is information about the motion and state (including facial expressions) of each user (U1, U2, U3) associated with the thermal sensation of the user (U1, U2, U3) who is showing the motion and state. The motions and expressions that the user naturally shows when the user feels hot or cold may be different for each user (U1, U2, U3). That is, it is considered that the users (U1, U2, U3) have different habits in terms of the motion and expression exhibiting a hot or cold sensation. Therefore, the user sensory information (63) is defined as a criterion that indicates the hot or cold sensation of each user (U1, U2, U3).

The CPU (65) functions as an estimation unit (66) and a model updating unit (68) by reading and executing various programs stored in the storage unit (62) and other memory than the storage unit (62).

Estimation of User's Thermal Sensation

The estimation unit (66) estimates the thermal sensation of the user (U1, U2, U3) using the image of the user (U1, U2, U3) taken by the camera (26) as an essential parameter. This estimation unit (66) includes an estimation model (67).

The estimation model (67) is a dedicated model for determining the thermal sensation of the user (U1, U2, U3) from the taken image through an arithmetic operation using a technique such as deep learning, and is previously constructed as a neural network. As shown in a dashed box in FIG. 4, the estimation model (67) of the present embodiment is mainly a two-layer neural network including an image processing neural network (67a) that performs image processing on the data of the image taken by the camera (26), and a thermal sensation estimation neural network (67b) that estimates the thermal sensation of the user (U1, U2, U3) from the result of the image processing.

The estimation unit (66) first inputs the data of the image taken by the camera (26) to the image processing neural network (67a). Through synchronization, edge detection, contrast processing, or any other suitable processing on the image data (moving image data in this example), the image processing neural network (67a) extracts the motion of the user (U1, U2, U3) such as a fanning motion, extracts the state of the user (U1, U2, U3) such as perspiring, calculates the amount of clothing the user (U1, U2, U3) wears (or the degree of undress), calculates the sex of the user (U1, U2, U3), and calculates the age of the user (U1, U2, U3). Specifically, in the image processing neural network (67a), an arithmetic operation is performed to obtain the particular motion, state, and clothing amount of the user (U1, U2, U3) representing the thermal sensation, the clothing amount (or the degree of undress) representing the degree of heat radiation by the user (U1, U2, U3), and the sex and age of the user that influence the thermal sensation.

Figure 5:
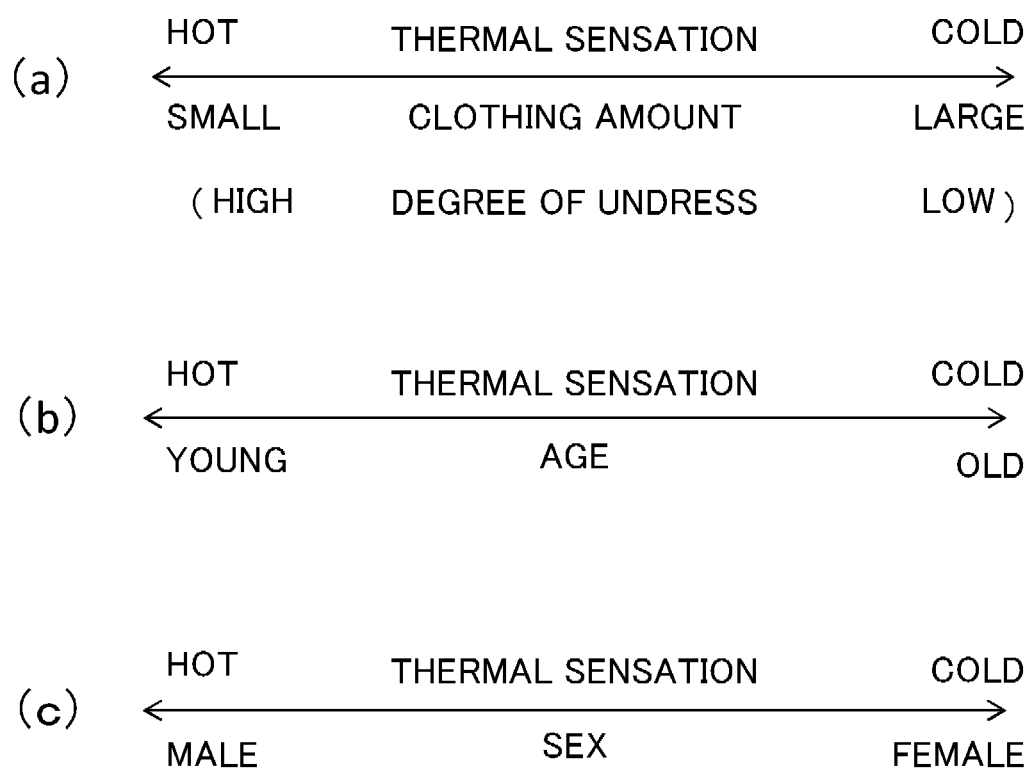
FIGS. 5A to 5C are diagrams respectively illustrating examples of a relationship between clothing amount and thermal sensation, a relationship between age and thermal sensation, and a relationship between sex and thermal sensation.

FIG. 5A conceptually shows an example of a relationship between increase and decrease in the clothing amount (or the degree of undress) and the thermal sensation. As shown in FIG. 5A, the smaller the clothing amount is (the higher the degree of undress is), the users (U1, U2, U3) feel "hotter," and the amount of heat radiation from the surface of the users (U1, U2, U3) increases. Conversely, the greater the clothing amount is (the lower the degree of undress is), the users (U1, U2, U3) feel "colder," and the amount of heat radiation from the surface of the users (U1, U2, U3) decreases. Thus, the calculated clothing amount (or the degree of undress) is one of the indices representing the thermal sensation.

FIG. 5B conceptually shows an example of a relationship between the age and the thermal sensation, and FIG. 5C an example of a relationship between the sex and the thermal sensation. If the temperature of the room (r1) is uniform at a certain level, the users (U1, U2, U3) of younger ages are more apt to feel "hot," and the users (U1, U2, U3) of older ages are more apt to feel "cold" as shown in FIG. 5B. If the temperature of the room (r1) is uniform at a certain level, male users are more apt to feel "hot" than female users, and the female users are more apt to feel "cold" than the male users as shown in FIG. 5C. The sex and age thus obtained are one of the indices that influence the thermal sensation.

Figure 4:
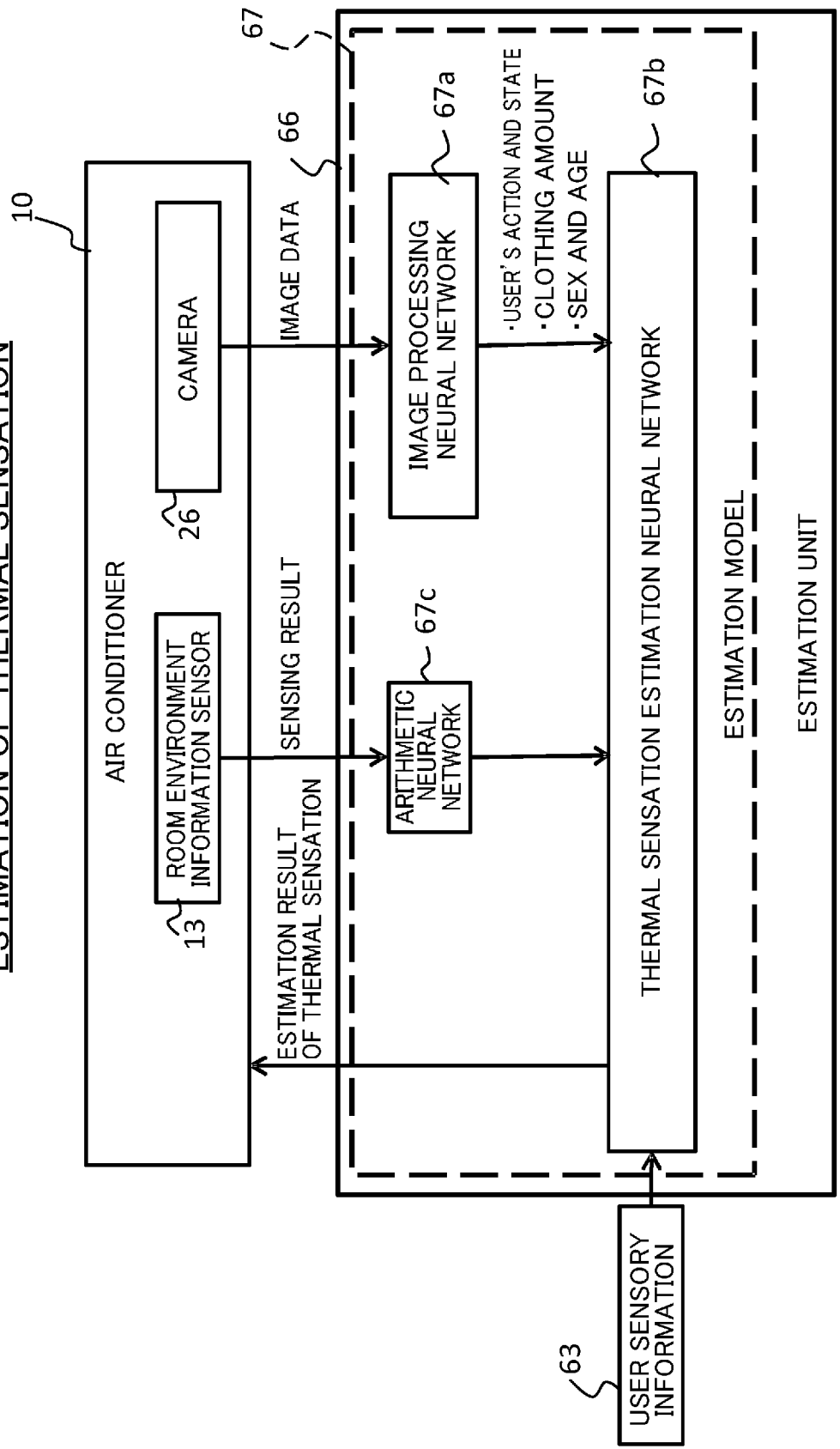
FIG. 4 is a conceptual diagram illustrating input and output of an estimation model in estimation of a thermal sensation according to a first embodiment.

As shown in FIG. 4, the result of the arithmetic operation outputted from the image processing neural network (67a) is inputted to the thermal sensation estimation neural network (67b) together with the extraction result. In the thermal sensation estimation neural network (67b), among the inputted results of extraction and arithmetic operation, the extraction result, which is the particular motion and state of the user (U1, U2, U3) representing the thermal sensation, is used to obtain the thermal sensation of each user (U1, U2, U3) with reference to the user sensory information (63) shown in FIG. 3. In this case, the inputted results of the arithmetic operation, i.e., the clothing amount (the degree of undress), the sex, and the age, are taken into account in the calculation of the thermal sensation of each user (U1, U2, U3).

Further, as shown in FIG. 4, information about the sensing result of the room environment information sensor (13) is inputted to the thermal sensation estimation neural network (67b). Examples of the information about the sensing result of the room environment information sensor (13) include the temperature of the room (r1), and the heat radiation amount of each user (U1, U2, U3) obtained in an arithmetic neural network (67c) using the humidity of the room (r1) which is one of the sensing results of the room environment information sensor (13). In the thermal sensation estimation neural network (67b), information about the sensing result of the room environment information sensor (13) is also taken into account in the calculation of the thermal sensation of each user (U1, U2, U3).

Thus, the thermal sensation of the user (U1, U2, U3) is finely estimated for each user.

The estimation unit (66) transmits the thermal sensation of the user (U1, U2, U3) obtained in this manner to the control unit (14) of the air conditioner (10) as the estimation result of the thermal sensation.

In this embodiment, the thermal sensation of each of the users (U1, U2, U3) is finely estimated as described above. Thus, the thermal sensation may vary by user (U1, U2, U3) beyond a predetermined range. In this case, the estimation unit (66) may obtain a mean value of the thermal sensation of each user (U1, U2, U3), or a weighted mean value weighted for each user, and may transmit the mean value or the weighted mean value to the control unit (14) of the air conditioner (10) as the estimated value of the thermal sensation.

Update of Estimation Model

Figure 6:
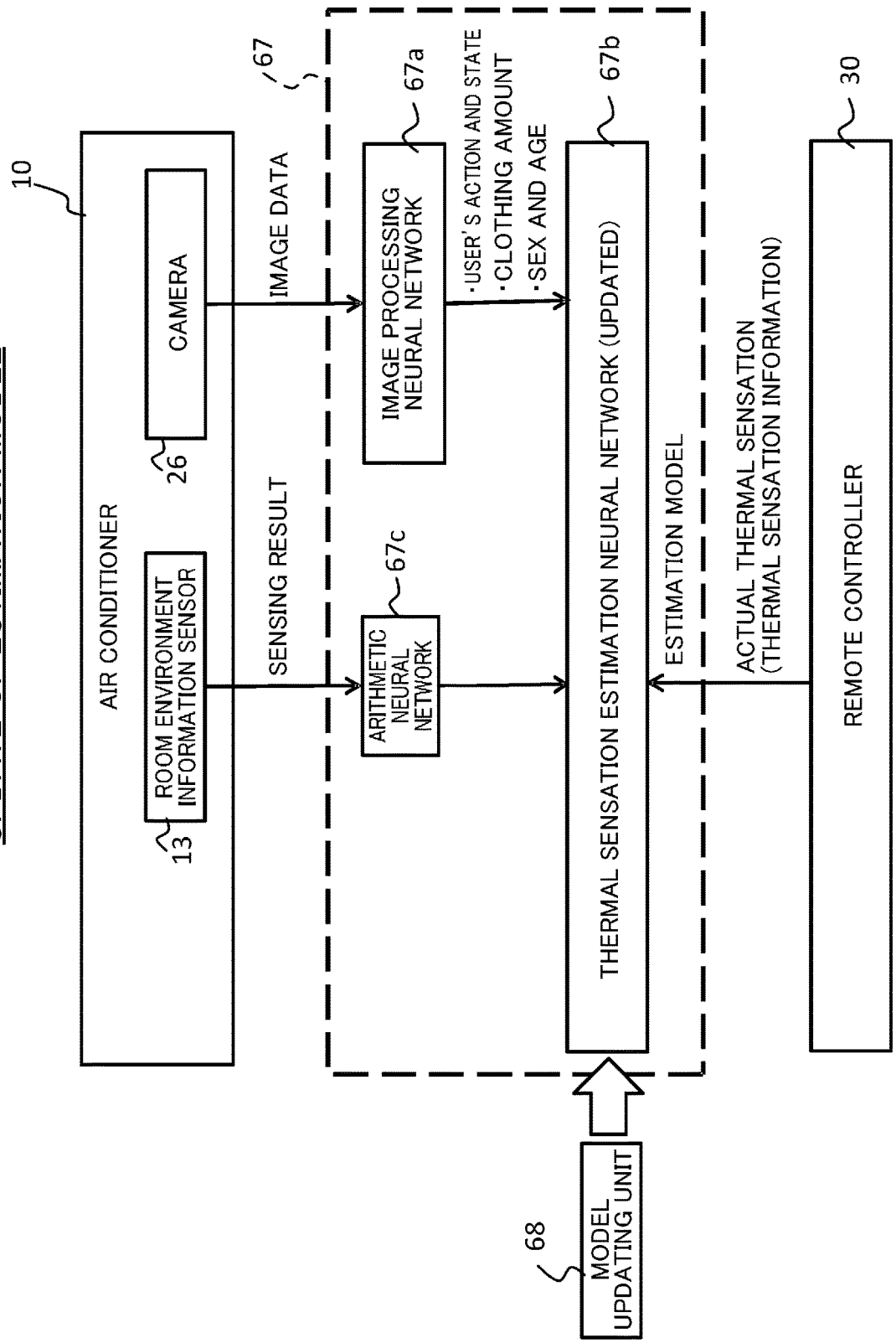
FIG. 6 is a conceptual diagram illustrating input and output of an estimation model in updating of the estimation model.

As shown in FIG. 6, the model updating unit (68) learns for the estimation model (67), based on the data of the image taken by the camera (26) and the thermal sensation information representing the actual thermal sensation of the user (U1, U2, U3) received via the remote controller (30).

An image newly taken by the camera (26) after the estimation of the thermal sensation may show, for example, a desired change in the motion and state of the user (U1, U2, U3), such as the user (U1, U2, U3) who was fanning has stopped fanning. In this case, it can be determined that the estimation of the thermal sensation is relatively satisfactory, and the air-conditioning operation (i.e., the first air-conditioning operation) performed based on the estimation result is making the thermal sensation of the user (U1, U2, U3) more comfortable. However, if such a desired change is not observed, the estimation of the thermal sensation may deviate from the actual thermal sensation. Thus, the model updating unit (68) updates the estimation model (67) using the image newly taken by the camera (26) so that the thermal sensation is estimated with improved accuracy.

The motion and state of the user (U1, U2, U3) representing the thermal sensation include, in addition to the fanning motion, whether and how much the user rolls the sleeves of the clothes that the user wears, whether and how much the user perspires, whether the user rubs his or her body, and the amount (degree) of body movement. If a desired change in these motions and states representing thermal comfort is observed, the air-conditioning operation (i.e., the first air-conditioning operation) based on the estimation result can be determined as making the thermal sensation of the user (U1, U2, U3) more comfortable, and the model updating unit (68) updates the estimation model (67).

For each motion and state, specific examples of grounds for the determination that the thermal sensation is getting more comfortable are described below.

(I) The sleeves of the clothes that have been rolled up before the air-conditioning operation are no longer rolled up, or rolled up less, after the air-conditioning operation.

(II) The amount of perspiration that has been large before the air-conditioning operation is reduced after the air-conditioning operation.

(III) The motion of rubbing the body that has been observed before the air-conditioning operation is no longer found after the air-conditioning operation.

(IV) The body movement that has been less active before the air-conditioning operation becomes more active after the air-conditioning operation.

As can be seen from these examples, whether the thermal comfort is improved can be determined not only from whether some motion and state is found, but also from an increase or decrease in the frequency of such motion and state, and these will be collectively referred to as a "desired change." If such a desired change is recognized from the image of the camera (26), the estimation by the estimation operation of the thermal sensation can be determined to be roughly identical to an actual hot or cold sensation, and the estimation model (67) is not updated.

The thermal sensation information that the user (U1, U2, U3) inputted via the remote controller (30) indicates the actual hot or cold sensation of the user (U1, U2, U3). Therefore, the model updating unit (68) also uses the thermal sensation information received via the remote controller (30) to update the estimation model (67).

Through such an updating operation, the estimation model (67) (specifically, the thermal sensation estimation neural network (67b)) is updated to a model that can calculate an estimation result that is closer to the actual thermal sensation.

If a desired change is found as a result of comparison between the motion and state of the user (U1, U2, U3) shown in the previously taken image and the motion and state of the user (U1, U2, U3) shown in the newly taken image, and/or when the thermal sensation information that the remote controller (30) received falls within a desired range of the thermal sensation information, the model updating unit (68) determines that the updating of the estimation model (67) is unnecessary, and may not update the estimation model (67). That is, the estimation model (67) may be updated if no desired change in the motion and state of the user (U1, U2, U3) is found as a result of comparison between the previously taken image and the newly taken image, and/or when the thermal sensation information received via the remote controller (30) is out of the desired range of the thermal sensation information. This can reduce the increase in load due to unnecessary processing performed by the CPU (65).

In this embodiment, the estimation model (67) to be updated is the thermal sensation estimation neural network (67b), but the image processing neural network (67a) and the arithmetic neural network (67c) may also be the targets to be updated.

As shown in FIG. 6, in the updating of the estimation model (67), information about the sensing result of the room environment information sensor (13) may also be used, or may not be used.

Figure 7:
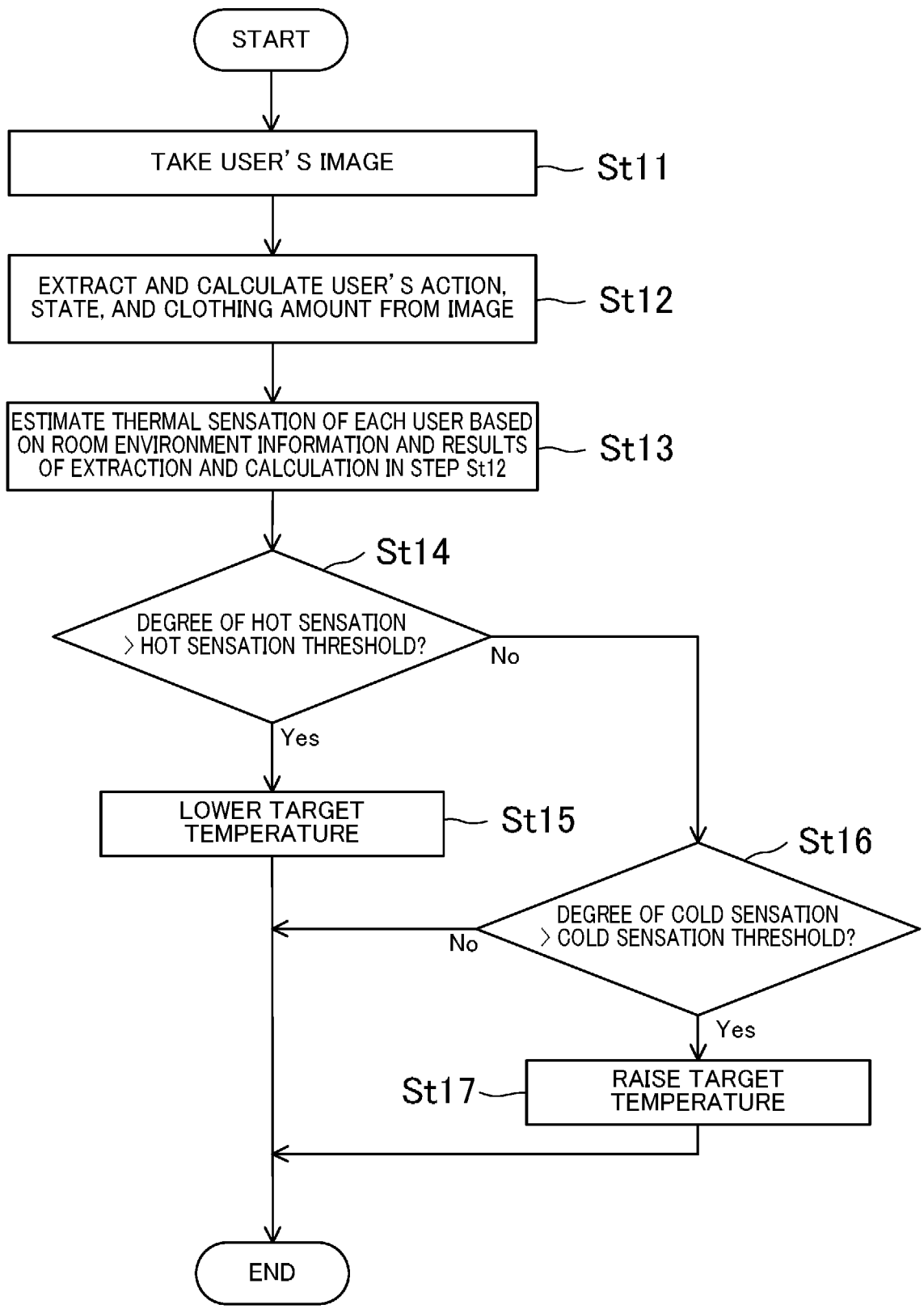
FIG. 7 is a flowchart illustrating an operation of estimating a thermal sensation of a user and an air-conditioning operation performed in accordance with the estimated thermal sensation of the user.

Air-Conditioning Operation in Accordance with Estimated User's Thermal Sensation FIG. 7 is a diagram illustrating the estimation operation of the thermal sensation of the users (U1, U2, U3) and the flow of the air-conditioning operation in accordance with the estimated thermal sensation.

The camera (26) takes an image of a user (U1, U2, U3) (St11). The image taken by the camera (26) is transmitted to the arithmetic device (60).

Using the image processing neural network (67a) in the estimation model (67), the estimation unit (66) in the arithmetic device (60) extracts the motion and state of each user (U1, U2, U3), and performs an arithmetic operation to obtain the clothing amount, sex, and age of the user (U1, U2, U3) (St12). The estimation unit (66) inputs the results of the extraction and arithmetic operation obtained in Step St12 to the thermal sensation estimation neural network (67b) in the estimation model (67), and estimates the thermal sensation of each user (U1, U2, U3) (St13). The estimation result of the thermal sensation is transmitted to the control unit (14) of the air conditioner (10).

The control unit (14) of the air conditioner (10) compares the degree of "hot" sensation in the estimated thermal sensation with a hot sensation threshold. If the degree of "hot" sensation exceeds the hot sensation threshold (Yes in St14), the control unit (14) lowers the target temperature of the room (r1) (St15). How much to lower the target temperature can be determined, for example, based on the difference between the degree of "hot" sensation and the hot sensation threshold. In Step St15, the air conditioner (10) increases the volume of cool air to be supplied to the room (r1), or supplies the cooler air to the room (r1). Shortly, the temperature of the room (r1) is lowered to the target temperature.

In Step St16, the control unit (14) of the air conditioner (10) compares the degree of "cold" sensation in the estimated thermal sensation with a cold sensation threshold. If the degree of "cold" sensation exceeds the cold sensation threshold (Yes in St16), the control unit (14) raises the target temperature of the room (r1) (St17). How much to raise the target temperature can be determined, for example, based on the difference between the degree of the "cold" sensation and the cold sensation threshold. In Step St17, the air conditioner (10) increases the volume of warm air to be supplied to the room (r1), or supplies the warmer air to the room (r1). Shortly, the temperature of the room (r1) increases to the target temperature.

Advantages

If the camera (26) takes an image showing the motion and state of the user (U1, U2, U3) representing a hot or cold sensation of the user (U1, U2, U3), the estimation unit (66) of the arithmetic device (60) estimates the thermal sensation of the user (U1, U2, U3) based on the image, and the control unit (14) of the air conditioner (10) controls the air-conditioning operation (first air-conditioning operation) based on the estimation result so that the thermal sensation of the user (U1, U2, U3) falls within the target range. Hence, even if the user (U1, U2, U3) does not give an instruction to the air conditioner (10) to raise or lower the target temperature by operating the remote controller (30) or the like, the air conditioner (10) automatically performs the estimation operation of the thermal sensation and the air-conditioning operation suitable for bringing the thermal sensation of the user (U1, U2, U3) within the target range. This improves the convenience of the user (U1, U2, U3), and automatically improves the comfort of the user (U1, U2, U3) in the room (r1).

In addition to the image of the user (U1, U2, U3), the sensing result of the room environment information sensor (13), such as the actual temperature of the room (r1), is also used for the estimation of the thermal sensation of the user (U1, U2, U3). This improves the estimation accuracy of the thermal sensation of the user (U1, U2, U3), and the air conditioner (10) can provide a more comfortable environment for the user (U1, U2, U3).

Humans reduce the clothing amount when they feel "hot," and increase the clothing amount when they feel "cold." Accordingly, the estimation unit (66) performs an arithmetic operation to obtain the clothing amount (the degree of undress) of the user (U1, U2, U3) from the image, and estimates the thermal sensation by additionally using the result of the arithmetic operation. This improves the estimation accuracy of the thermal sensation of the user (U1, U2, U3), and the air conditioner (10) can provide a more comfortable environment for the user (U1, U2, U3).

The difference in age and sex may influence how humans feel "hot" or "cold." Accordingly, the estimation unit (66) performs an arithmetic operation to obtain the age and sex of the user (U1, U2, U3) from the image, and estimates the thermal sensation by additionally using the result of the arithmetic operation. This improves the estimation accuracy of the thermal sensation of the user (U1, U2, U3), and the air conditioner (10) can provide a more comfortable environment for the user (U1, U2, U3).

The camera (26) is provided for the air conditioner (10) installed in the ceiling. Therefore, the camera (26) can take the image of the user (U1, U2, U3) in the room (r1) with reduced possibility that the user (U1, U2, U3) is blocked by some obstacles.

The estimation unit (66) measures the thermal sensation of each of users (U1, U2, U3) present in the room (r1). Thus, the air conditioner (10) can perform the air-conditioning operation in accordance with the thermal sensation of each user (U1, U2, U3).

The motion and state that the user (U1, U2, U3) shows when the user (U1, U2, U3) feels "hot" or "cold" may be different for each user (U1, U2, U3). Therefore, the estimation unit (66) uses the user sensory information (63) representing the motion and the state that each user (U1, U2, U3) shows when he or she feels "hot" or "cold" to check against the motion and the state of the user (U1, U2, U3) shown in the image actually taken. This improves the estimation accuracy of the thermal sensation of each user (U1, U2, U3), and the air conditioner (10) can provide a more comfortable environment for the user (U1, U2, U3).

Learning is performed for the estimation model (67), based on the image of the user (U1, U2, U3) and the thermal sensation information of the user (U1, U2, U3) received via the remote controller (30). The estimation unit (66) performs the operation of estimating the thermal sensation using the estimation model (67) that has learned. This improves the estimation accuracy of the thermal sensation of the user (U1, U2, U3).

The actual thermal sensation of the user (U1, U2, U3) is recognized from the image taken by the camera (26) after the air-conditioning operation performed based on the estimation result of the estimation unit (66). The estimation model (67) is learned based on the result of the recognition. More specifically, the learning for the estimation model (67) is performed based on a change in the motion and state based on which the thermal sensation of the user (U1, U2, U3) has been determined through comparison between the image taken by the camera (26) after the air-conditioning operation (first air-conditioning operation) performed based on the estimation result of the estimation unit (66) and the image taken by the camera (26) before the air-conditioning operation (first air-conditioning operation). Here, the change in the motion and state based on which the thermal sensation of the user (U1, U2, U3) has been determined is a decrease in the frequency of the motion and state, or an absence of the motion and state. As a result, whether the estimation result of the estimation model (67) matches the actual thermal sensation or not can be determined with more accuracy, and the accuracy of the estimation model (67) further improves so that the estimation result of the estimation model (67) matches the actual thermal sensation as much as possible. Performing the operation of estimating the thermal sensation of the user (U1, U2, U3) using the estimation model (67) that has learned further improves the estimation accuracy of the thermal sensation of the user (U1, U2, U3).

Second Embodiment

In the present embodiment, the air-conditioning control apparatus (50) of the first embodiment further includes a thermographic sensor (128) (corresponding to a surface temperature measuring unit), and the estimation unit (66) additionally uses the sensing result of the thermographic sensor (128) for estimating the thermal sensation of the user (U1, U2, U3).

FIG. 8 is a view corresponding to FIG. 4 of the first embodiment, and is a conceptual diagram illustrating input and output of an estimation model (67) in estimation of the thermal sensation according to the present embodiment. As shown in a dashed box in FIG. 8, the estimation model (67) in the estimation unit (66) is previously constructed as a neural network dedicated for obtaining the thermal sensation of the user (U1, U2, U3) from the data of the taken image through an arithmetic operation, similarly to that of the first embodiment. Specifically, the estimation model (67) is mainly a two-layer neural network including an image processing neural network (67a) and a thermal sensation estimation neural network (67b).

The input and output of the image processing neural network (67a) are the same as those of the first embodiment.

The thermal sensation estimation neural network (67b) receives the results of extraction and arithmetic operation of the image processing neural network (67a), the information about the sensing result of the room environment information sensor (13), and the sensing result of the thermographic sensor (128).

The thermographic sensor (128) measures the surface temperature of each user (U1, U2, U3) in the room (r1). The thermographic sensor (128) may be attached anywhere in the room (r1) without any particular limitations, and may be incorporated in, for example, the remote controller (30), or may be attached to the bottom surface (21) of the air conditioner (10).

As shown in FIG. 8, similarly to the sensing result of the room environment information sensor (13) that undergoes arithmetic processing in the arithmetic neural network (67c), the sensing result of the thermographic sensor (128) may undergo a predetermined arithmetic operation in another arithmetic neural network (67d), and then be inputted to the thermal sensation estimation neural network (67b).

In the thermal sensation estimation neural network (67b), the thermal sensation of each user (U1, U2, U3) is obtained based on the results of the extraction and arithmetic operation of the image processing neural network (67a) in the same manner as in the first embodiment. In this case, the user sensory information (63) is used as a reference in the same manner as in the first embodiment. The sensing result of the thermographic sensor (128) is taken into account in the calculation of the thermal sensation of each user (U1, U2, U3), similarly to the information about the sensing result of the room environment information sensor (13).

As shown in FIG. 9, the sensing result of the thermographic sensor (128) may also be used for the updating of the estimation model (67), together with the results of extraction and arithmetic operation of the image processing neural network (67a) and the information about the sensing result of the room environment information sensor (13).

Other than the features described with reference to FIGS. 8 and 9, i.e., the configuration of the air-conditioning system (100) using the air-conditioning control apparatus (50), the user sensory information (63), and the air-conditioning operation using the estimation result are the same as those described in the first embodiment, and will not be described below.

In the present embodiment, the actual surface temperature of the user (U1, U2, U3) is additionally used to estimate the thermal sensation of the user (U1, U2, U3). This further improves the estimation accuracy of the thermal sensation of the user (U1, U2, U3), and the air conditioner (10) can provide a more comfortable environment for the user (U1, U2, U3).

Other Embodiments

In the first and second embodiments, the amount of heat generated by the user (U1, U2, U3) may be obtained through an arithmetic operation from the movement of the user (U1, U2, U3) extracted from the image, and the result may be used to estimate the thermal sensation.

In the first and second embodiments, the estimation unit (66) may additionally use the sensing result of the heart rate of each user (U1, U2, U3) to estimate the thermal sensation of the users (U1, U2, U3). Thus, the thermal sensation of each user (U1, U2, U3) can be recognized more finely. The heart rate of each user (U1, U2, U3) may be calculated as information representing the state of each user (U1, U2, U3) from the image taken by the camera (26), or may be sensed by a sensor provided separately from the camera (26) to detect the heart rate. The heart rate of each user (U1, U2, U3) may be used for the learning of the estimation model (67).

In the first and second embodiments, a sensor different from the suction sensor may be provided as the room environment information sensor (13). The information about the room sensed by the room environment information sensor (13) is not limited to the temperature and humidity of the room (r1), and may include various types of information about the environment in the room (r1). The sensing result of the room environment information sensor (13) may be the temperature of the room (r1) only.

The thermal sensation information of the user (U1, U2, U3) inputted via the remote controller (30) may be used for fine adjustment and learning of the control of the air-conditioning operation (corresponding to the first air-conditioning operation). The image newly taken by the camera (26) may also be used not only for the updating of the estimation model (67), but also for fine adjustment and learning of the control of the air-conditioning operation (corresponding to the first air-conditioning operation), similarly to the thermal sensation information.

Examples of the fine adjustment and learning of the control of the air-conditioning operation include fine adjustment and learning of target values of the position of the flap (16), the rotational speed of the indoor fan (12), and the set temperature of the room (r1), which are used in the air-conditioning operation for improving the thermal comfort.

For example, suppose that the degree of "hot" sensation in the thermal sensation of the user (U1, U2, U3) estimated by the estimation unit (66) exceeds a hot sensation threshold. In this case, the thermal sensation of the user (U1, U2, U3) can be determined to be "hot." The control unit (14) controls the position of the flap (16) so that the conditioned air is supplied to the user (U1, U2, U3), and lowers the target value of the set temperature of the room (r1) by, for example, two degrees, so that the cooler conditioned air is supplied to the user (U1, U2, U3).

At this time, if there is a single user (U1, U2, U3) whose degree of "hot" sensation is greater than the hot sensation threshold, the control unit (14) fixes the position of the flap (16) so that the air is directed to this user (U1, U2, U3). When there are some users (U1, U2, U3) each having the degree of "hot" sensation greater than the hot sensation threshold, the control unit (14) may swing the flap (16) so that the conditioned air swings to be supplied to each of the users (U1, U2, U3).

Thereafter, the camera (26) newly takes an image. Using this image, the estimation unit (66) re-estimates the thermal sensation of the user (U1, U2, U3) to which the conditioned air is supplied. As a result, when the degree of "hot" sensation of the user (U1, U2, U3) becomes equal to or lower than the hot sensation threshold and the degree of "cold" sensation becomes equal to or lower than the cold sensation threshold, the control unit (14) can determine that the thermal sensation of the user (U1, U2, U3) who felt hot has turned to be comfortable, and thus, learns that the control of the air-conditioning operation performed so far has been appropriate to the user (U1, U2, U3).

On the other hand, when the degree of "hot" sensation of the user (U1, U2, U3) is still greater than the hot sensation threshold, the control unit (14) further lowers the target value of the set temperature of the room (r1) by two degrees, and increases the rotational speed of the indoor fan (12). As a result, the cooler conditioned air is supplied to the users (U1, U2, U3) at an increased volume.

When there are still some users (U1, U2, U3) each having the degree of "hot" sensation greater than the hot sensation threshold, the control unit (14) may control the position of the flap (16) so that the flap (16) swings in a way different from the swinging movement so far. For example, the control unit (14) changes the time interval for swinging the flap (16) vertically or horizontally depending on the positions of the users (U1, U2, U3), or temporarily stops the flap (16) in the course of the swinging movement.

In addition, when the number of users (U1, U2, U3) having the degree of "hot" sensation greater than the hot sensation threshold is reduced, the control unit (14) may control the position of the flap (16) to adjust the vertical and horizontal directions of the air so that the conditioned air is supplied only to the users (U1, U2, U3) who still feel hot.

When the number of users (U1, U2, U3) who feel hot is reduced to one, the control unit (14) may perform control so that the flap (16) stops swinging and stays at a fixed position in order to supply the conditioned air only to the user (U1, U2, U3) who still feels "hot".

Thereafter, the camera (26) takes the image again, and the estimation unit (66) re-estimates the thermal sensation of the user (U1, U2, U3) from the image. As a result, when the degree of "hot" sensation becomes equal to or less than the hot sensation threshold and the degree of "cold" sensation becomes equal to or lower than the cold sensation threshold, the control unit (14) can determine that the thermal sensation of the user (U1, U2, U3) who felt hot has turned to be comfortable. At this time, the control unit (14) learns a series of item of control of the air-conditioning operation necessary for making the thermal sensation of the user (U1, U2, U3) more comfortable, and sets the target values, such as the set temperature of the room (r1) and the rotational speed of the indoor fan (12), to the final values set in the air-conditioning control performed this time so that the values can be used for the subsequent air-conditioning operation (first air-conditioning operation). That is, from the next time, the air-conditioning operation (first air-conditioning operation) at the set temperature after the learning is automatically started. Therefore, the next air-conditioning operation (first air-conditioning operation) easily and reliably makes the thermal sensation of the user (U1, U2, U3) more comfortable.

In particular, when the flap (16) is allowed to swing in the air-conditioning operation (first air-conditioning operation) described above, the control unit (14) preferably learns how the flap (16) swings when a plurality of users (U1, U2, U3) feels comfortable.

In the learning of such air-conditioning control, what (thermal sensation information) is inputted by the user (U1, U2, U3) via the remote controller (30) described in the first and second embodiments may also be used. That is, the control unit (14) may determine whether or not the current air-conditioning control is effective for making the thermal sensation more comfortable by using the thermal sensation information inputted after the air-conditioning control, and may update the item of the air-conditioning control by learning. In this case, the control unit may construct a control model used for the air-conditioning control, and may learn for the control model.

In the above control of the air-conditioning operation, it has been described that the position of the flap (16), the rotational speed of the indoor fan (12), and the set temperature of the room (r1) are finely adjusted and learned, but at least one of them may be finely adjusted and learned.

In the first and second embodiments, it has been described that the image shows the motion and state of the user (U1, U2, U3) representing the hot or cold sensation of the user (U1, U2, U3). However, the image may show at least one of the motion or state of the user (U1, U2, U3). In this case, the extraction result of the image processing neural network (67a) is at least one of the motion or state of the user (U1, U2, U3).

The sensing result of the room environment information sensor (13) is not necessarily used for the estimation of the thermal sensation.

The result of the arithmetic operation for obtaining the clothing amount of the user (U1, U2, U3) is not necessarily used for the estimation of the thermal sensation.

The result of the arithmetic operation for obtaining the sex and age of the user (U1, U2, U3) is not necessarily used for the estimation of thermal sensation.

If the sex and age of the user (U1, U2, U3) are used for the estimation of the thermal sensation, one of the sex or age of the user (U1, U2, U3) may be used for the estimation of the thermal sensation.

The air conditioner (10) is not limited to the one installed in the ceiling of the room (r1), and may be an air conditioner installed on a wall surface or a floor.

The camera (26) may be attached anywhere as long as it can take the image of the user (U1, U2, U3) in the room (r1), and is not necessarily provided for the air conditioner (10). For example, the camera (26) may be a web camera mounted on a personal computer owned by the user (U1, U2, U3).

The air-conditioning control apparatus (50) of the first and second embodiments can also be applied to the case where a single user is present in the room (r1).

In addition, if users are present in the room (r1), the air-conditioning control apparatus (50) does not necessarily estimate the thermal sensation of every user, and may perform the estimation for any of the users.

The estimation unit (66) does not necessarily use the user sensory information (63) for the estimation of the thermal sensation.

The updating operation of the estimation model (67) may not be performed.

If the updating operation of the estimation model (67) is performed, the parameter to be used for updating the estimation model (67) may be the same or different from that used for estimating the thermal sensation. For example, the parameter used for estimating the thermal sensation may be at least one of the image, the temperature and humidity of the room, the temperature and humidity of the air blown out from the air outlet (24), the volume of the air, the direction of the air, or the air conditioning capacity. The parameter used for updating the estimation model (67) may be at least one of the image, the temperature and humidity of the room, the speed of the air, or the radiation temperature.

In the first and second embodiments, it has been described that the thermal sensation is estimated by using the estimation model (67) constructed by the neural network, but the thermal sensation may be estimated, for example, by executing a program, without using the estimation model (67).

In the first and second embodiments, it has been described that the "remote controller (30)" is used as the receiving unit that receives the input of the thermal sensation information. However, the receiving unit may be configured as a device other than the remote controller, such as a smartphone, a tablet, or a personal computer. Further, the thermal sensation information may be inputted by voice.

Industrial Applicability

As can be seen in the foregoing, the present invention is useful for an air-conditioning control apparatus that estimates a thermal sensation of a user and controls an air-conditioning operation based on the estimation result.

DESCRIPTION OF REFERENCE CHARACTERS

10 Air Conditioner
13 Room Environment Information Sensor (Sensor)
14 Control Unit
26 Camera (Imaging Unit)
30 Remote Controller (Receiving Unit)
50 Air-Conditioning Control Apparatus
62 Storage Unit
64 User Sensory Information
66 Estimation Unit
67 Estimation Model
68 Model Updating Unit
U1, U2, U3 User
128 Thermographic Sensor (Surface Temperature Measuring Unit)

The invention claimed is:

1. An air-conditioning control apparatus, comprising:
an imager that takes an image of at least one user;
a processor that estimates a thermal sensation representing how hot or cold the at least one user feels based on the image of the at least one user taken by the imager; and
a controller that controls a first air-conditioning operation of an air conditioner based on an estimation result of the processor so that the thermal sensation falls within a target range, the air conditioner targeting a room in which the at least one user is present, wherein
the image shows a motion of the at least one user representing a hot or cold sensation of the user and/or a state of the at least one user representing a hot or cold sensation of the at least one user,
the processor extracts the motion of the at least one user and/or the state of the at least one user from the image to estimate the thermal sensation,
the processor recognizes an actual thermal sensation of the at least one user from the image taken by the imager after the first air-conditioning operation performed based on the estimation result of the processor, and learns for an estimation model used for estimating the thermal sensation, based on a recognition result, and
the processor learns for the estimation model based on a change in the motion and state based on which the thermal sensation of the at least one user has been determined through comparison between the image taken by the imager after the first air-conditioning operation performed based on the estimation result of the processor and the image taken by the imager before the first air-conditioning operation.

2. The air-conditioning control apparatus of claim 1, wherein
the air conditioner includes a sensor that senses room environment information about an environment in the room, and
the processor estimates the thermal sensation also based on the room environment information.

3. The air-conditioning control apparatus of claim 1, wherein
the processor calculates a clothing amount of the at least one user from the image, and estimates the thermal sensation also based on the calculated clothing amount.

4. The air-conditioning control apparatus of claim 1, wherein
the processor calculates sex and/or an age of the at least one user from the image, and estimates the thermal sensation also based on the calculated sex and/or age of the at least one user.

5. The air-conditioning control apparatus of claim 1, further comprising:
a surface temperature measuring sensor that measures a surface temperature of the user present in the room, wherein
the processor estimates the thermal sensation also based on a measurement result of the surface temperature measuring sensor.

6. The air-conditioning control apparatus of claim 1, wherein
the air conditioner is installed in a ceiling of the room, and
the imager is provided for the air conditioner.

7. The air-conditioning control apparatus of claim 1, wherein
if the at least one user includes users present in the room, the processor estimates the thermal sensation of each of the users.

8. The air-conditioning control apparatus of claim 7, further comprising:
a storage that stores user sensory information about the motion and/or state of each of the users associated with the thermal sensation of the user who is showing the motion and/or the state, wherein
the processor
extracts the motion and/or state of each of the users from the image, and
estimates the thermal sensation of the user using an extraction result and the user sensory information.

9. The air-conditioning control apparatus of claim 1, further comprising:
a receiver capable of receiving thermal sensation information inputted by the at least one user, the thermal sensation information representing the thermal sensation of the at least one user, wherein
the processor learns for an estimation model used for estimating the thermal sensation, based on the image taken by the imager and/or the thermal sensation information received via the receiver.

10. The air-conditioning control apparatus of claim 1, wherein
the change in the motion and state based on which the thermal sensation of the at least one user has been determined is a decrease in frequency of the motion and state, or an absence of the motion and state.

11. The air-conditioning control apparatus of claim 1, further comprising:
a receiver capable of receiving thermal sensation information inputted by the at least one user, the thermal sensation information representing the thermal sensation of the at least one user, wherein
the controller learns an item of control of the first air-conditioning operation based on the thermal sensation information received via the receiver after the first air-conditioning operation performed based on the estimation result of the processor so that the thermal sensation of the at least one user falls within the target range.

12. The air-conditioning control apparatus of claim 11, wherein
the item of the control of the first air-conditioning operation include at least one of a rotational speed of an indoor fan included in the air conditioner, a position of a flap adjusting a direction of air blown out from the air conditioner, or a set temperature of the air conditioner.

13. The air-conditioning control apparatus of claim 1, wherein
the controller learns an item of control of the first air-conditioning operation based on the image taken by the imager after the first air-conditioning operation performed based on the estimation result of the processor so that the thermal sensation of the user falls within the target range.

* * * * *